May 11, 1954   L. G. HILKEMEIER   2,678,198
DRUM TRACK OR TIRE

Filed March 20, 1951   2 Sheets-Sheet 1

FIG. I

LOUIS G. HILKEMEIER
INVENTOR.

BY

May 11, 1954

L. G. HILKEMEIER 2,678,198

DRUM TRACK OR TIRE

Filed March 20, 1951

LOUIS G. HILKEMEIER
INVENTOR.

BY *Robt Meyer*
*attorney*

Patented May 11, 1954

2,678,198

UNITED STATES PATENT OFFICE 2,678,198

DRUM TRACK OR TIRE

Louis G. Hilkemeier, Plainfield, N. J., assignor to Worthington Corporation, Harrison, N. J., a corporation of Delaware Application March 20, 1951, Serial No. 216,539

4 Claims. (Cl. 259—175)

This invention relates generally to machines having rotatable mixing drums and more particularly to a drum track or tire for said mixing drum.

It has been found on those rotatable mixing drums wherein the drum track consists of a solid annular member welded to the mixing drum that breakdowns will occur during operation thereof due to the loss of flexibility at the weld point between the different type steels of which the drum track and mixing drum are formed.

The present invention seeks to overcome this difficulty by means of a drum track support member of the same or substantially similar steel which is welded to the rotatable mixing drum and upon which the drum track is shrunk fit. Suitable keeper means being provided or utilized if necessary to prevent lateral movement of the drum track.

Accordingly, it is an object of the present invention to provide a novel drum track construction for a rotatable mixing drum.

It is another object of the present invention to provide a drum track construction for a rotatable mixing drum wherein the drum track support therefor will retain its flexibility after being connected to the mixing drum and not break down during rotation of the mixing drum.

It is a further object of the present invention to provide means for preventing the lateral displacement of the drum track on its drum track support.

With these and other objects in view, as may appear from the accompanying specification, the invention consists of various features of construction and combination of parts, which will be first described in connection with the accompanying drawings, showing a drum track or tire of a preferred form embodying the invention, and the features forming the invention will be specifically pointed out in the claims.

Figure 1:
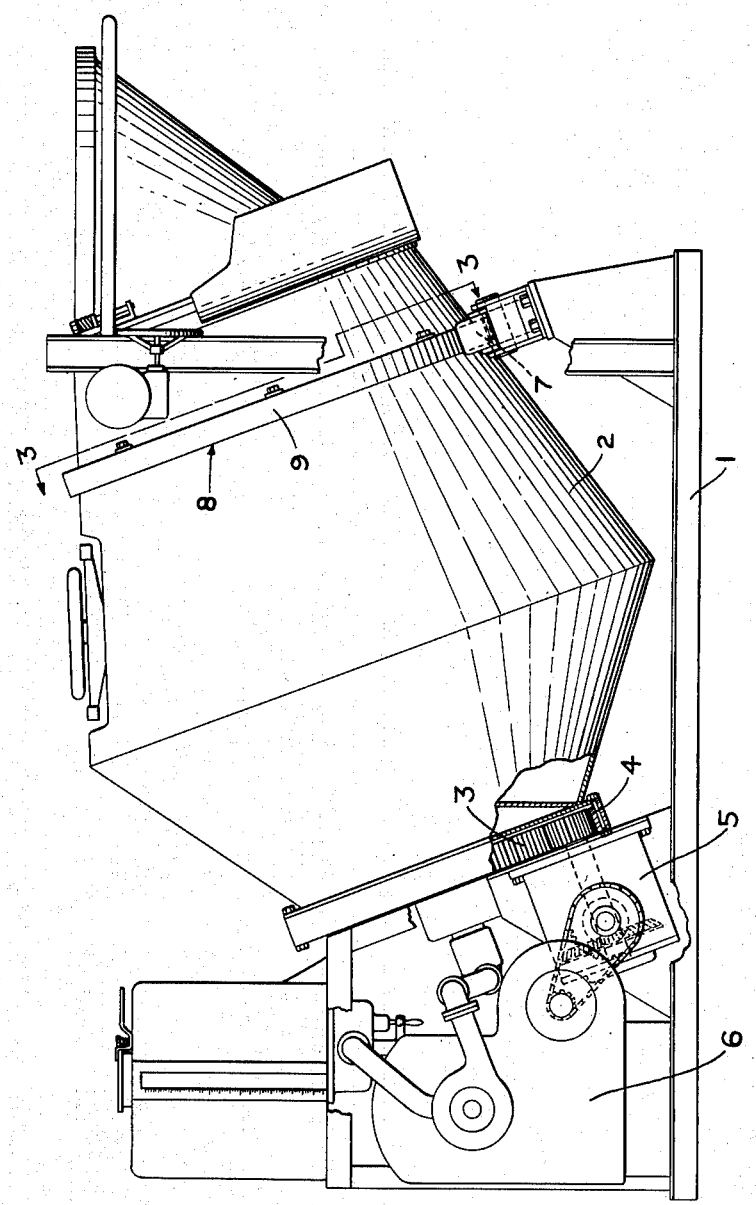
Figure 1 is a side elevation of a transit type truck mixer having a rotatable drum thereon showing the invention on said drum.

Referring more particularly to the drawings, Figure 1 shows a transit type truck mixer having a frame 1. Mounted on said frame 1 is a mixing drum 2 which is rotated by means of a drum gear ring 3 and pinion member 4 which is in turn connected by suitable means 5 to a prime mover 6. There are many well known types of connecting means and prime movers easily purchasable on the open market and therefore they are not described here as they do not form part of the present invention.

Mounted remotely from the means for rotating the drum are smooth rollers 7 which receive for rotation thereon the drum track 8 which is connected to the mixing drum 2 as is hereinafter described.

Figure 2:
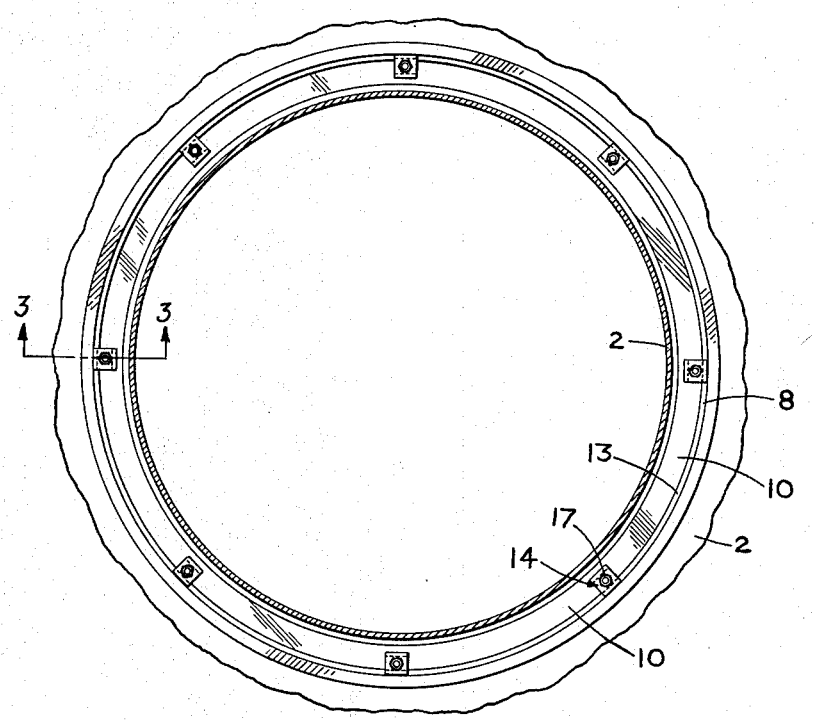
Figure 2 is a front view of the invention taken on the line 3—3 of Figure 1.
Figure 3:
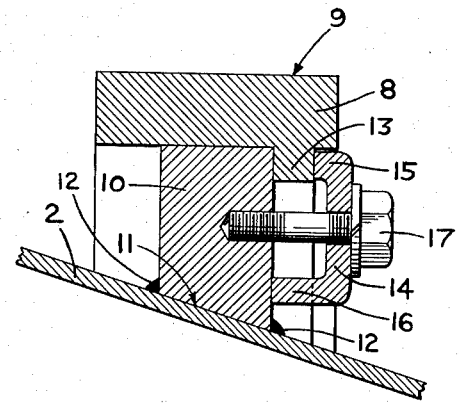
Figure 3 is a section through the invention taken on the line 3—3 of Figure 2.

The drum track 8 is a substantially light cylindrical shell being rectangular in cross section so that its rolling face 9 will be true when it is shrunk fit onto a suitable drum track support 10 as is shown in Figures 2 and 3 of the drawings. It is formed of high carbon steel to give it the maximum useful life.

The drum track support 10 is shown in Figures 2 and 3 having a substantially annular construction and having its inner face 11 beveled so that it may snugly engage the outer surface of the mixing drum 2 to which it will be welded as at 12. The drum track support 10 will be of a mild steel similar to that of the mixing drum so that the welds will not reduce the flexibility of this joinder. It will be understood that while the drum track support is shown as a single annular member that it might consist of a plurality of arcuate or similarly shaped supports without departing from the purpose thereof.

To prevent or insure against lateral displacement of the drum track 8 an annular flange 13 is formed on the inner circumference of said drum track 8 which will extend inwardly adjacent to said drum track support 10 when the drum track 8 is shrunk fit in position. Annularly spaced U-shaped brackets 14 threadably connected to said drum track support 10 are provided for abutting contact at the ends of the legs 15 and 16 thereof with the annular flange 13 and the drum track support 10 respectively which necessitates leg 15 being shorter than leg 16, all of which is clearly shown in Figures 2 and 3 of the drawings. By turning the threaded member 17 the brackets 14 will force the flange 13 into tight engagement with the drum track support 10 and this will also prevent any lateral shifting of the drum track 8.

Figure 4:
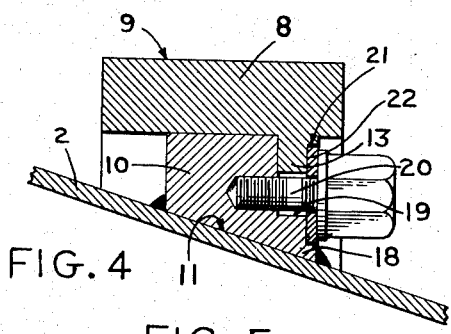
Figure 4 is a section showing a modified form of the invention.

Figure 4 shows a modified construction of the invention wherein a simplified means of preventing lateral displacement is provided which reduces the size of the annular drum track support 10.

Figure 5:
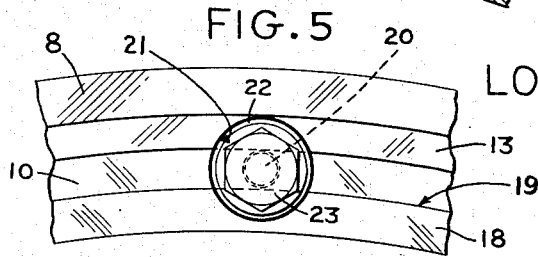
Figure 5 is a front view showing the modified form of the invention.

In the modified form the annular drum track support 10 is provided with a lateral projection or shoulder 18 continuous with the inner circumference of the support 10 having the beveled face 11. This lateral projection or shoulder will be substantially identical in thickness to the annular flange 13 in the drum track 8. When the drum track 8 is shrunk fit into position an annular space 19 will be formed between the annular flange 13 on the drum track and the lateral projection or shoulder 18 on the drum track support 10 such that a portion of the face of the drum track support 10 adjacent annular flange 13 will be adapted to receive annularly spaced studs 20 as is clearly shown in Figures 4 and 5 of the drawings. Spaced coincidentally with the studs 20 are counterbores 21 found in the faces of the annular flange 13 and the lateral projection 18, having their centers on the axial line of said studs 20. Machined washers 22 are mounted about said studs to fit into said counterbores 21 and are locked in position by cap nuts 23. Threading the cap nuts 23 inwardly will force the washer member into engagement with the counterbores 21 thus forcing the annular flanges 13 into tight engagement with the track support 10 to prevent any lateral shifting of the drum track 8. In addition, this modified construction also prevents any rotation of the drum track 8 relative to the drum track support.

It is believed obvious that this latter construction could be further modified by eliminating the counterbores 21 and lateral displacement would also be prevented. However, the advantage of the counterbores 21 in that it prevents relative rotation of the drum track 8 with respect to the drum track support 10 would not be insured by this modified form of the construction shown in Figure 4.

It will be understood that the invention is not to be limited to the specific construction or arrangement of parts shown, but that they may be widely modified within the invention defined by the claims.

What is claimed is:

1. The combination with a rotatable mixing drum having a discharge opening at one end thereof, and driving means for rotating said mixing drum, of a separate annular drum track support means welded to the outer circumference of said mixing drum near the discharge end thereof, a drum track mounted on said support means to provide a surface of rotation for said mixing drum, an annular flange on the inner circumference of said drum track adapted to abut said support means, a U-shaped bracket having one leg thereof shorter than the other leg, and a threaded member to mount said U-shaped bracket on said support means whereby said shorter leg will abut against the flange portion of the drum track and the other leg will abut against the support member.

2. A drum track for a rotatable mixing drum including, separate drum track support means welded to the outer circumference of said mixing drum, a drum track snugly mounted on said drum track support, an annular flange on the inner circumference of said drum track adapted to abut said support means, a U-shaped bracket having one leg thereof shorter than the other leg, and a threaded member connecting said U-shaped bracket to said support means whereby the shorter of said legs abuts said flange and the other leg abuts against said support means when the threaded member is tightened.

3. The combination with a rotatable mixing drum of a mild steel alloy and driving means for rotating said drum of separate support means of similar steel alloy to that of the mixing drum welded to the outer circumference of said mixing drum, an annular member mounted on said support means to provide a surface of rotation for said mixing drum, a U-shaped bracket having one leg thereof shorter than the other leg, and a threaded member to mount said U-shaped bracket on said support means whereby said shorter leg will abut against the flange portion of the drum track and the other leg will abut against the support member.

4. A drum track construction for a rotatable mixing drum of mild alloy steel including, a separate drum track support means of similar steel alloy to that of the drum welded to the outer circumference of said mixing drum, a drum track snugly mounted on said drum track support means, a U-shaped bracket having one leg thereof shorter than the other leg, and a threaded member to mount said U-shaped bracket on said support means whereby said shorter leg will abut against the flange portion of the drum track and the other leg will abut against the support member.

References Cited in the file of this patent

UNITED STATES PATENTS

| Number | Name | Date |
| --- | --- | --- |
| 894,813 | Buzzell | Aug. 4, 1908 |
| 1,055,599 | Ball | Mar. 11, 1913 |
| 1,085,548 | Cridge | Jan. 27, 1914 |
| 1,536,491 | Gunderoth | May 5, 1925 |
| 1,744,667 | Olsen | Jan. 21, 1930 |
| 2,058,751 | Woolfrey | Oct. 27, 1936 |
| 2,299,392 | Johnson et al. | Oct. 20, 1942 |
| 2,543,595 | Patten | Feb. 27, 1951 |

FOREIGN PATENTS

| Number | Country | Date |
| --- | --- | --- |
| 436,358 | Great Britain | Oct. 9, 1935 |
| 753,644 | France | Oct. 20, 1933 |